United States Patent
Ausserlechner

(10) Patent No.: US 12,510,575 B2
(45) Date of Patent: Dec. 30, 2025

(54) APPARATUS AND METHOD FOR MEASURING AN ELECTRIC CURRENT

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 196 days.

(21) Appl. No.: 18/487,604

(22) Filed: Oct. 16, 2023

(65) Prior Publication Data

US 2024/0133932 A1 Apr. 25, 2024
US 2024/0230735 A9 Jul. 11, 2024

(30) Foreign Application Priority Data

Oct. 24, 2022 (DE) .......................... 102022127985.5

(51) Int. Cl.
 *G01R 27/08* (2006.01)

(52) U.S. Cl.
 CPC ................... *G01R 27/08* (2013.01)

(58) Field of Classification Search
 CPC ............... G01R 19/0092; G01R 1/203; G01R 31/2805; G01R 15/146; G01R 31/2818; G01R 19/15; G01R 27/08; G01R 31/28; G01R 31/2812; G01R 21/06; G01R 31/52; G01R 31/66; G01R 19/0084; G01N 27/04; G01N 27/045; H01R 9/2625
 See application file for complete search history.

(56) References Cited

U.S. PATENT DOCUMENTS

| | | | | |
|---|---|---|---|---|
| 5,006,808 A | * | 4/1991 | Watts ................. | G01R 31/2805 324/763.01 |
| 5,172,063 A | * | 12/1992 | Munikoti ............. | G01R 31/281 324/763.01 |
| 5,502,390 A | * | 3/1996 | Olsen ................. | G01R 31/2812 324/73.1 |

(Continued)

FOREIGN PATENT DOCUMENTS

DE 60117625 T2 1/2007
DE 102014222430 B4 11/2018

(Continued)

*Primary Examiner* — Vinh P Nguyen
(74) *Attorney, Agent, or Firm* — Harrity & Harrity, LLP

(57) ABSTRACT

The present disclosure relates to an apparatus for measuring a first electric current in a first printed conductor of a printed circuit board, which also includes a second printed conductor, wherein the ratio of electrical resistances between the first and second printed conductors is known. The apparatus includes a device for measuring a first electric voltage across the first printed conductor based on the first electric current in the first printed conductor, a device for injecting a known second electric current into the second printed conductor, a device for measuring a second electric voltage across the second printed conductor based on the known second electric current in the second printed conductor, and a device for determining the first electric current based on the first electric voltage, the second electric voltage, the known second electric current and the known ratio of electrical resistances between the first and second printed conductors.

20 Claims, 7 Drawing Sheets

(56) References Cited

U.S. PATENT DOCUMENTS

| | | | | |
|---|---|---|---|---|
| 5,701,667 | A | * 12/1997 | Birch | ............... G01R 31/2805 |
| | | | | 324/763.01 |
| 6,194,909 | B1 | * 2/2001 | Belforte | ............... H04M 3/26 |
| | | | | 324/73.1 |
| 2012/0218022 | A1 | 8/2012 | Lazarov et al. | |
| 2019/0377012 | A1 | 12/2019 | Soo et al. | |
| 2021/0072294 | A1 | 3/2021 | Xiang et al. | |

FOREIGN PATENT DOCUMENTS

| | | |
|---|---|---|
| DE | 102017219016 A1 | 4/2019 |
| EP | 2752672 A1 | 7/2014 |
| WO | 2016041658 A1 | 3/2016 |
| WO | 2020096840 A1 | 5/2020 |

* cited by examiner

APPARATUS AND METHOD FOR MEASURING AN ELECTRIC CURRENT

CROSS-REFERENCE TO RELATED APPLICATION

This application claims priority to German Patent Application No. 102022127985.5 filed on Oct. 24, 2022, the content of which is incorporated by reference herein in its entirety.

TECHNICAL FIELD

The present disclosure relates in general to apparatuses and methods for measuring electric currents and, in particular, to apparatuses and methods for measuring electric currents in the printed conductors of a printed circuit board.

BACKGROUND

For current measurement, for example, current measuring resistors are known, which are also described as "shunts". For the measurement of current, a shunt is incorporated in a conductor of the current which is to be measured. A small voltage drop across the shunt is measured.

Shunts are additional components associated with additional costs, space requirements, weight, additional soldered connections, increased volume and additional wiring. Shunts are also susceptible to aging.

There is thus a requirement for alternative or improved methods for current measurement, particularly for current measurement in the printed conductors of a printed circuit board.

SUMMARY

This requirement is fulfilled by the devices and methods according to the independent patent claims. Advantageous further developments are the subject matter of the dependent patent claims.

According to a first aspect of the present disclosure, an apparatus is proposed for measuring a first electric current in a first printed conductor of a printed circuit board. The printed circuit board also includes at least a second printed conductor. A ratio of electrical resistances between the first and second printed conductors is predefined or known. The proposed apparatus includes a device for measuring a first electric voltage across the first printed conductor, by reference to the first electric current flowing in the first printed conductor. The apparatus further includes a device for injecting a predefined or known second electric current into the second printed conductor, and a device for measuring a second electric voltage across the second printed conductor by reference to the predefined or known second electric current flowing in the second printed conductor. The apparatus also includes a device for determining the first electric current based on the first electric voltage, the second electric voltage, the predefined or known second electric current and the predefine or known ratio of electrical resistances between the first and second printed conductors.

The proposed measuring apparatus is not susceptible, or is less susceptible to ageing of the first printed conductor (primary conductor).

According to some example implementations, the first printed conductor is implemented in at least one metal layer of the printed circuit board. The second printed conductor is preferably implemented in the same at least one metal layer of the printed circuit board. The resistance of the second printed conductor (calibration track) assumes a clearly defined ratio to the resistance of the first printed conductor (primary conductor). It is therefore preferable that both printed conductors are embodied in the same metal layer of a printed circuit board laminate. If the first printed conductor is included of multiple layers, the second printed conductor can also be included of the same layers. In simple implementations, the first printed conductor employs only one metal layer. The second printed conductor will then also employ the same metal layer.

According to some example implementations, the first printed conductor and the second printed conductor are galvanically isolated from one another. A clearance between the two printed conductors, insofar as possible, is thus greater than a creepage distance.

According to some example implementations, the device for determining the first electric current is configured to determine a second electrical resistance of the second printed conductor based on the second electric voltage and the predefined or known second electric current, and to determine the first electric current based on the first electric volage, the second electrical resistance and the known ratio of the electrical resistances of the first and second printed conductors. The proposed measuring apparatus thus measures the first current in the first printed conductor on the printed circuit board or card by reference to the first voltage along the first printed conductor. The second printed conductor (calibration track) is connected to the measuring apparatus, and functions as a reference resistance. The measuring apparatus injects the known second current (calibration current) into the second printed conductor, and measures the resulting drop in the second voltage, from which the second resistance (calibration resistance) of the second conductor can be determined. Thereafter, the first current (primary current) can be determined, wherein the first voltage is divided by the calibration resistance and multiplied by a scaling constant, which is given by the known resistance ratio of the two printed conductors.

According to some example implementations, the second electrical resistance of the second printed conductor is greater (e.g., at least 10 times greater, and preferably at least 100 times greater) than the first electrical resistance of the first printed conductor. This can be achieved, for example, wherein a second ratio of length ($L_2$) to width ($W_2$) of the second printed conductor is greater (e.g., at least 10 times greater, and preferably at least 100 times greater) than a first ratio of length ($L_1$) to width ($W_1$) of the first printed conductor. The first printed conductor can thus assume a first printed conductor width ($W_1$) and a first printed conductor length ($L_1$). The second printed conductor can assume a second printed conductor width ($W_2$) and a second printed conductor length ($L_2$). The second printed conductor width ($W_2$) can be smaller than the first printed conductor width ($W_1$), and the second printed conductor length ($L_2$) can be greater than the first printed conductor length ($L_1$).

According to some example implementations, the device is configured for the injection of the predefined or known second electric current, in the form of a current pulse having a predefined current strength and a predefined frequency, into the second printed conductor. The predefined frequency of the second current, for example, can be sufficiently greater than 1/(thermal time constant of the first printed conductor), such that measuring errors associated with thermo-electromotive forces can be prevented. The predefined frequency of the second current, for example, can lie between 1 kHz and 100 kHz, as this exceeds the cut-off frequency of the 1/f-noise ratio of integrated electronic devices. The second electric current, for example, can also be injected in accordance with environmental influences (such as temperature, mechanical stress or a major variation in the current strength of the first current) in a region surrounding the first and/or second printed conductor(s). In the event of little or no variation in environmental influences, the second electric current can be injected in an occasional manner only, such that the second electric voltage is also measured in an occasional manner only. In the event of regular variations in ambient influences, the second electric current can be injected more frequently, and the second electric voltage measured more frequently. This means that an injection rate of the second electric current can be adjusted in accordance with a variation in environmental influences. The greater the variation, the higher the injection rate.

According to some example implementations, the second printed conductor includes a first printed conductor section and a second printed conductor section. The first printed conductor section forms an (open) conductor loop for a current flux having a first direction of rotation. The second printed conductor section forms an (open) conductor loop for a current flux having a second direction of rotation, which is in opposition to the first direction of rotation. The injection device can be configured to inject a (calibration) current corresponding to the second electric current (with respect to current strength and frequency), in the first direction of rotation, into the first printed conductor section, and a current corresponding to the second electric current (with respect to current strength and frequency), in the second direction of rotation, into the second printed conductor section. This can advantageously counteract disturbances associated with electromagnetic interference (EMI).

Temporally fluctuating magnetic fields can generate disturbances in the printed conductor section(s). The system can employ two looped printed conductor sections, which are arranged and configured such that the same disturbances occur in both loops. The two printed conductor sections can be connected, such that disturbances are cleared in a combined voltage of both printed conductor sections. An arrangement of this type can be characterized in that calibration currents at the center of both loops generate magnetic fields, in opposing directions, at the centers of both loops.

According to some example implementations, the device for measuring the second electric voltage is configured to determine the second electric voltage based on a combination of respective voltage drops across the first and second printed conductor sections of the second printed conductor. For example, voltage drops across the first and second printed conductor sections can be subtracted, such that disturbances can be factored out. To this end, the first and second printed conductor sections ideally assume the same EMI susceptibility in each case. This means that the printed conductor sections are configured such that uniform interference fields in the two printed conductor sections induce the same interference signals, such that the latter cancel each other out, or are mutually cleared. Moreover, the printed conductor sections can be configured such that non-uniform interference fields in the first printed conductor (primary conductor) generate identical interference signals in both printed conductor sections, such that these signals also cancel each other out.

According to some example implementations, the device for measuring the first electric voltage, the device for measuring the second electric voltage and the device for determining the first electric current are implemented in a common surface-mounted device component (SMD component), which includes terminals for the first printed conductor and the second printed conductor. The SMD component can be, for example, a sensor IC.

According to some example implementations, the SMD component includes a first and a second terminal for measuring the first electric voltage across the first printed conductor, a third and fourth terminal for measuring the second electric voltage across the second printed conductor, and a fifth and sixth terminal for injecting the second electric current into the second printed conductor. Terminals of the SMD component can be, for example, soldering terminals of a housing of the SMD components.

According to some example implementations, the first printed conductor is connected to the first and second soldering terminals. The second printed conductor is connected to the third, fourth, fifth and sixth soldering terminals. The second printed conductor can be configured as a one-piece conductor (with no interruption or connecting piece included of elements other than the relevant metal layer), and connected to four contacts of the SMD component (chip): for example, two outer contacts for the infeed and discharge of current, and two intervening voltage tap-off contacts. These contacts can be soldering points, optionally arranged in series with bonding wires, or with lands, balls or bumps in state-of-the-art package technologies.

According to some example implementations, the known ratio of electrical resistances of the first and second printed conductors are saved in a (semiconductor) memory of the surface-mounted device component, such that the first electric current can be determined accordingly.

According to a further aspect of the present disclosure, a printed circuit board is proposed. The printed circuit board includes a first printed conductor (primary conductor) having a first electrical resistance and a second printed conductor (calibration track) having a second electrical resistance. The first electrical resistance and the second electrical resistance assume a predefined or known ratio to one another. The resistance ratio can be saved, for example, in an apparatus for measuring a first electric current in the first printed conductor.

According to some example implementations of the printed circuit board, the first printed conductor (primary conductor) is implemented in at least one metal layer of the printed circuit board. The second printed conductor (calibration track) is then implemented in the same at least one metal layer of the printed circuit board. It can thus be achieved that the resistance of the calibration track assumes an exactly defined ratio to the resistance of the primary conductor.

According to some example implementations of the printed circuit board, the first printed conductor and the second printed conductor are galvanically isolated from one another. This can be achieved, for example, using a minimum clearance between the printed conductors, corresponding to a creepage distance.

According to some example implementations of the printed circuit board, the second electrical resistance of the second printed conductor is greater (e.g., at least 10 times greater, and preferably at least 100 times greater) than the first electrical resistance of the first printed conductor. This can be achieved, for example, wherein a second ratio of length ($L_2$) to width ($W_2$) of the second printed conductor is greater (e.g., at least 10 times greater, and preferably at least 100 times greater) than a first ratio of length ($L_1$) to width ($W_1$) of the first printed conductor. The first printed conductor can thus assume a first printed conductor width ($W_1$) and a first printed conductor length ($L_1$). The second printed conductor can assume a second printed conductor width ($W_2$) and a second printed conductor length ($L_2$). The second printed conductor width ($W_2$) can be smaller than the first printed conductor width ($W_1$) and the second printed conductor length ($L_2$) can be greater than the first printed conductor length ($L_1$).

According to some example implementations, the second printed conductor forms at least one (open) conductor loop.

According to some example implementations of the printed circuit board, the second printed conductor includes a first printed conductor section and a second printed conductor section. The first printed conductor section forms an (open) conductor loop having a first direction of rotation. The second printed conductor section forms an (open) conductor loop having a second direction of rotation, which is in opposition to the first direction of rotation. The injection device can be configured to inject a current corresponding to the second electric current (with respect to current strength and frequency), in the first direction of rotation, into the first printed conductor section, and a current corresponding to the second electric current (with respect to current strength and frequency), in the second direction of rotation, into the second printed conductor section. This can advantageously counteract disturbances associated with electromagnetic interference (EMI).

According to some example implementations of the printed circuit board, the first and the second printed conductor sections assume the same EMI susceptibility in each case.

According to some example implementations, the printed circuit board further includes a surface-mounted device component (SMD component) having contact-connections with the first and second printed conductors, wherein the surface-mounted device component is configured to measure a first voltage drop across the first printed conductor associated with a first electric current flowing in the first printed conductor, to inject a known second electric current into the second printed conductor, to measure a second voltage drop across the second printed conductor associated with the second electric current flowing in the second printed conductor, and to determine the first electric current based on the first voltage drop, the second voltage drop, the second electric current and the known ratio of the electrical resistances of the first and second printed conductors.

According to a further aspect of the present disclosure, a method is proposed for measuring a first electric current flowing in a first printed conductor of a printed circuit board, which also includes a second printed conductor, wherein a ratio of the electrical resistances of the first and second printed conductors is known or predefined. The method includes a measurement of a first electric voltage across the first printed conductor associated with the first electric current flowing in the first printed conductor, an injection of a known second electric current into the second printed conductor, a measurement of a second electric voltage across the second printed conductor associated with the second electric current flowing in the second printed conductor, and a determination of the first electric current based on the first electric voltage, the second electric voltage, the second electric current and the known ratio of the electrical resistances of the first and second printed conductors.

BRIEF DESCRIPTION OF THE DRAWINGS

A number of examples of apparatuses and/or methods are described in greater detail hereinafter, for example purposes only, with reference to the attached figures. In the figures.

DETAILED DESCRIPTION

A number of examples will now be described in detail, with reference to the attached figures. However, further potential examples are not limited to the features of implementations which are described in detail. These can comprise modifications of features, or equivalences and alternatives to the features. Moreover, terminology employed for the description of the examples specified herein is not restrictive with respect to further potential examples.

In the entire description of the figures, identical or similar reference symbols identify identical or similar elements or features, which can be respectively implemented in an identical or modified form, whilst delivering an identical or similar function. In the figures, moreover, thicknesses of lines, layers and/or regions can be overridden in the interests of clarification.

If two elements A and B are combined by the use of "or", this is to be understood as the disclosure of all potential combinations, e.g., only A, only B, or A and B, unless specifically defined otherwise in individual cases. As an alternative wording for the same combinations, "at least one of A and B" or "A and/or B" can be employed. The same applies, in an equivalent manner, to combinations of more than two elements.

If a singular form, e.g., "a, an" or "the" is employed, and the employment of a single element is not defined as mandatory, either explicitly or implicitly, further examples can also employ multiple elements for the implementation of the same function. If the implementation of a function is described hereinafter as employing multiple elements, further examples can implement the same function by the employment of a single element or a single processing entity. It is further understood that the terms "incorporates", "incorporating", "comprises" and/or "comprising", the employment of which describes the presence of features, whole numbers, steps, operations, processes, elements and components disclosed, and/or of a group thereof, do not exclude the presence or addition of one or more further features, whole numbers, steps, operations, processes, elements and components, and/or of a group thereof.

Figure 1:
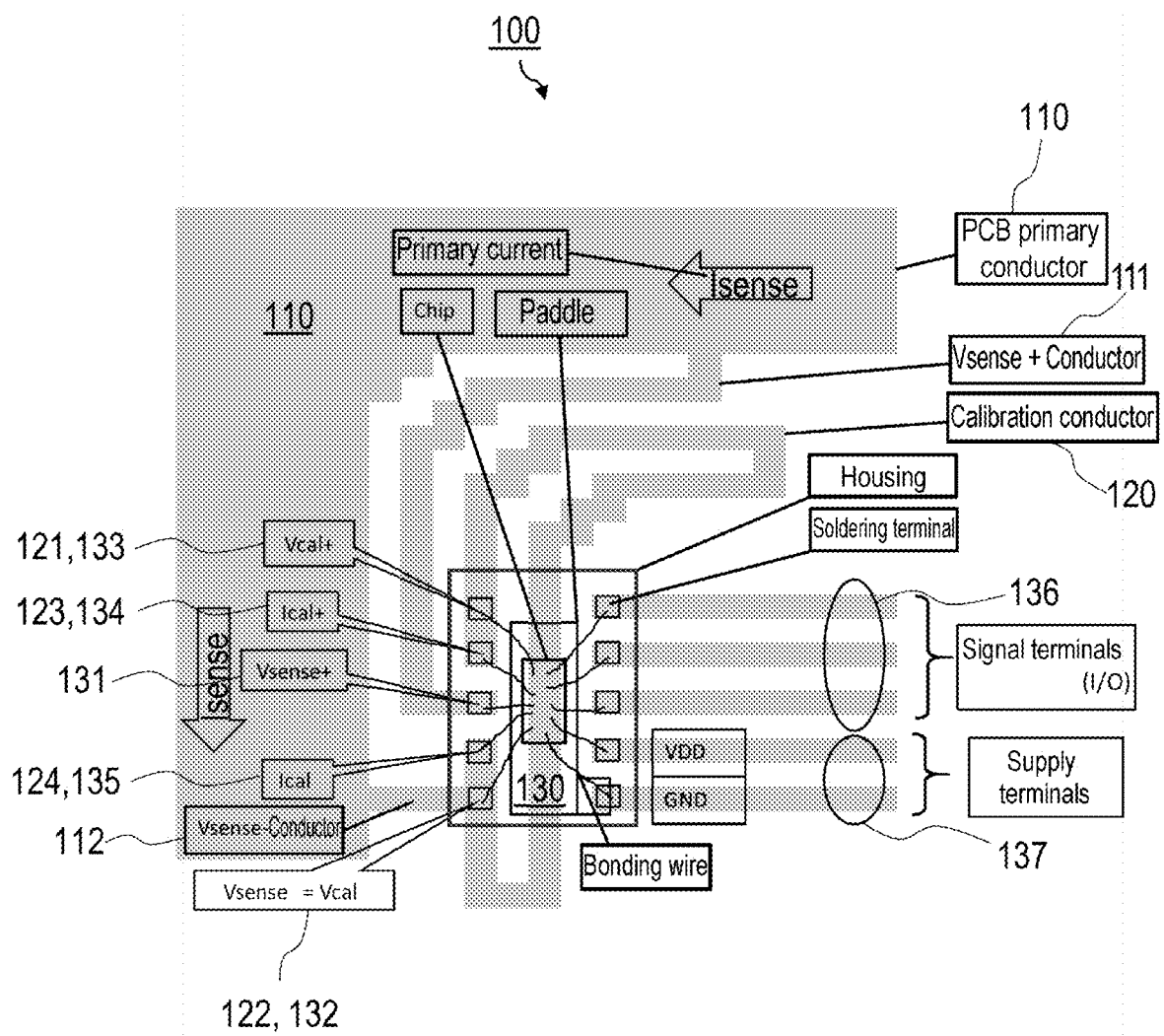
FIG. 1 shows a first example implementation of an apparatus for measuring a first electric current in a first printed conductor of a printed circuit board.

FIG. 1 shows a schematic representation of a printed circuit board or card 100 having a first printed conductor 110 (primary conductor) and a second printed conductor 120 (calibration conductor). The two printed conductors 110, 120 are separated from one another, e.g., are configured in a mutually galvanically isolated arrangement. Both printed conductors 110, 120, for example, can be formed of copper. In the example represented, the first printed conductor 110 is bent through a right-angle. The second printed conductor 120 is configured in the bend of the first printed conductor 110, in the form of an open conductor loop having two mutually separated conductor ends. It will nevertheless be evident to a person skilled in the art that numerous different geometries of the two printed conductors 110, 120 are possible, according to the printed circuit board layout.

The first printed conductor 110 has an unknown first electrical resistance R1. The second printed conductor 120 has an unknown second electrical resistance R2. However, a ratio R1/R2 of the electrical resistances of the first printed conductor 110 and the second printed conductor 120, dictated by layout, is known or predefined. This can be achieved, for example, using specific geometries of the first printed conductor 110 and the second printed conductor 120. For example, a ratio of length ($L_2$) to width ($W_2$) of the second printed conductor 120 can be greater (e.g., at least 10 times greater, and preferably at least 100 times greater) than a ratio of length ($L_1$) to width ($W_1$) of the first printed conductor 110. The first printed conductor 110 can thus assume a first printed conductor width ($W_1$) and a first printed conductor length ($L_1$). The second printed conductor 120 can assume a second printed conductor width ($W_2$) and a second printed conductor length ($L_2$). The second printed conductor width ($W_2$) can be smaller than the first printed conductor width ($W_1$) and the second printed conductor length ($L_2$) can be greater than the first printed conductor length ($L_1$). As a result, a predefined resistance ratio R1/R2 can be achieved, even though the electrical resistances R1, R2 of the printed conductors themselves 110, 120 are not known. It can be particularly advantageous that the two printed conductors 110, 120 are implemented in the same metal layer or in the same metal layers of the printed circuit board 100. A square number of the second printed conductor 120 can be (for example at least 10 times) greater than the square number of the first printed conductor 110. The square number describes the ratio given by the resistance of the respective printed conductor and the sheet resistance. The sheet resistance is the ratio of specific resistance to thickness. If the printed conductors are comprised of long straight strips, the square number corresponds to the aspect ratio L/W.

For example, the first resistance R1 can be embodied as a parallel-connected arrangement of printed conductors in the metal layers 1 and 2, whereas the second resistance R2 is embodied as a series-connected arrangement of the metal layers 1 and 2. As a result, the resistance ratio R2/R1 can be increased by a further factor of 4 (if all the metal layers are of equal thickness). For every 3 metal layers, the resistance ratio can even be increased by a factor of 9. Moreover, the resistance of the first printed conductor or primary conductor 110 will be lower, the greater the number of metal layers, which is desirable in many cases.

The known resistance ratio R1/R2 can be employed for determining a first electric current Isense in the first printed conductor (primary conductor) 110.

To this end, first printed conductor 110 comprises, at a first conductor end, a first connecting lead 111 (Vsense+) and, at the second conductor end, a second connecting lead 112 (Vsense−). The length ($L_1$) of the first printed conductor 110 can thus be defined by the segment of the first printed conductor 110 between the two connecting leads 111, 112. In the example implementation represented, the connecting leads 111, 112 of the first printed conductor 110 are routed to corresponding soldering terminals 131, 132 of a sensor IC 130. The sensor IC 130 comprises a first integrated circuit part (not represented) for measuring a first electric voltage (Vsense) across the first printed conductor 110 or between the connecting leads 111, 112, associated with the (unknown) first electric current Isense in the first printed conductor 110. The connecting leads 111, 112 for measuring the first electric voltage (Vsense) do not necessarily need to be comprised of multiple metal layers (the resistance of which is irrelevant).

The second printed conductor (calibration conductor) 120 comprises, at a first conductor end, a first connecting terminal 121 (Vcal+) and, at a second conductor end, a second connecting terminal 122 (Vcal−). In the example implementation represented, the terminals 112 (Vsense) and 122 (Vcal−) are mutually short-circuited, and are both coupled to the soldering terminal 132 of the sensor IC 130. The soldering terminal 132 is connected to the first and second printed conductors 110, 120. The first connecting terminal 121 (Vcal+) of the second printed conductor 120 is coupled to a soldering terminal 133 of the sensor IC 130. The second printed conductor 120 further comprises, at its first conductor end, a third connecting terminal 123 (Ical+) and, at its second conductor end, a fourth connecting terminal 124 (Ical−). In the example implementation represented, the connecting terminals 123, 124 of the second printed conductor 120 are connected to corresponding soldering terminals 134, 135 of the sensor IC 130. The length ($L_2$) of the second printed conductor 120 can thus be defined by the circuit segment between the two connecting terminals 121, 122.

The sensor IC 130 comprises a second integrated circuit part (not represented) for injecting a predefined or known second electric current Ical into the second printed conductor 120. To this end, the second circuit part of the sensor IC 30, for example, can comprise a current source which is configured to generate the predefined or known second electric current (Ical). To this end, for example, the current source can comprise a bandgap circuit for the generation of the known second electric current as a reference current. The second electric current Ical (calibration current) can then be injected into the second printed conductor 120 via the two connecting terminals 123, 124 which are arranged at different ends of the second printed conductor 120. A resulting voltage drop of a second electric voltage (Vcal) across the second printed conductor 120 can be measured between the connecting terminals 121, 122 of the sensor IC 130. To this end, the sensor IC 130 can comprise an (unrepresented) third integrated circuit part, which is configured to measure the second electric voltage (Vcal) across the second printed conductor 120, associated with the second electric current (Ical) flowing in the second printed conductor 120. From the second electric voltage (Vcal) and the second electric current (Ical), the second electrical resistance R2 of the second printed conductor 120 can be determined, wherein R2=Vcal/Ical.

A further (unrepresented) integrated circuit part of the sensor IC 130 can be configured to determine the first electric current (Isense) based on the measured first electric voltage (Vsense), the measured second electric voltage (Vcal), the predefined second electric current (Ical) and the known ratio RAT=R1/R2 of the electrical resistances of the first and second printed conductors 110, 120. The first electric current (Isense) can be calculated based on the measured first electric voltage (Vsense), the measured second electric voltage (Vcal), the predefined second electric current (Ical) and the known ratio RAT=R1/R2. For example, the second electrical resistance R2 of the second printed conductor 120 can be calculated based on the measured second electric voltage (Vcal) and the known second electric current (Ical), in accordance with R2=Vcal/Ical. The first electric current (Isense) can then be calculated based on the measured first electric voltage (Vcal), the second electrical resistance (R2) and the known ratio RAT=R1/R2, wherein Isense=Vsense/R1=Vsense/(Vcal/Ical*RAT) or Isense=Vsense/(R2*RAT). The first electric current (Isense) in the primary conductor 110 thus determined can then be delivered as an output, for example via I/O terminals 136 of the sensor IC 130. The sensor IC 130 can be supplied via supply terminals 137.

The example apparatus (sensor-IC) 130 for measuring the first electric current Isense is accommodated in a SMD housing having 10 terminals. The five left-hand terminals 131-135 can be employed for measurement: the voltage drop on the primary conductor 110 can be measured between the connecting leads 111, 112 or terminals 131 (Vsense+) and 132 (Vsense−). The long and narrow calibration conductor 120 can be connected between the terminals 123 (Ical+) and 124 (Ical−), where the predefined calibration current Ical can be injected. The voltage drop on this calibration conductor 120 can be measured between the terminals 121 (Vcal+) and 122 (Vcal−). Vcal− and Vsense− can be identical (see FIG. 1).

The sensor IC 130 is thus configured to execute the following method:
- Measurement of a first electric voltage Vsense across the primary conductor 110 based on the electric current Isense flowing in the primary conductor 110 which is to be measured;
- Injection of the known calibration current Ical into the calibration conductor 120;
- Measurement of a second electric voltage Vcal across the calibration conductor 120 based on the known calibration current Ical flowing in the calibration conductor 120, and
- Determination of the first electric current based on the first electric voltage Vsense, the second electric voltage, the calibration current Ical and the known ratio RAT of the electrical resistances R1 and R2.

It should be observed that the individual steps of this method do not need to be executed in a temporally staggered manner, but can optionally be executed in complete isolation: for example, two subsystems can be provided, operating in a mutually asynchronous manner, one of which measures the voltage drop on the primary conductor 110 and the other of which measures the voltage drop on the calibration conductor 120.

Figure 2:
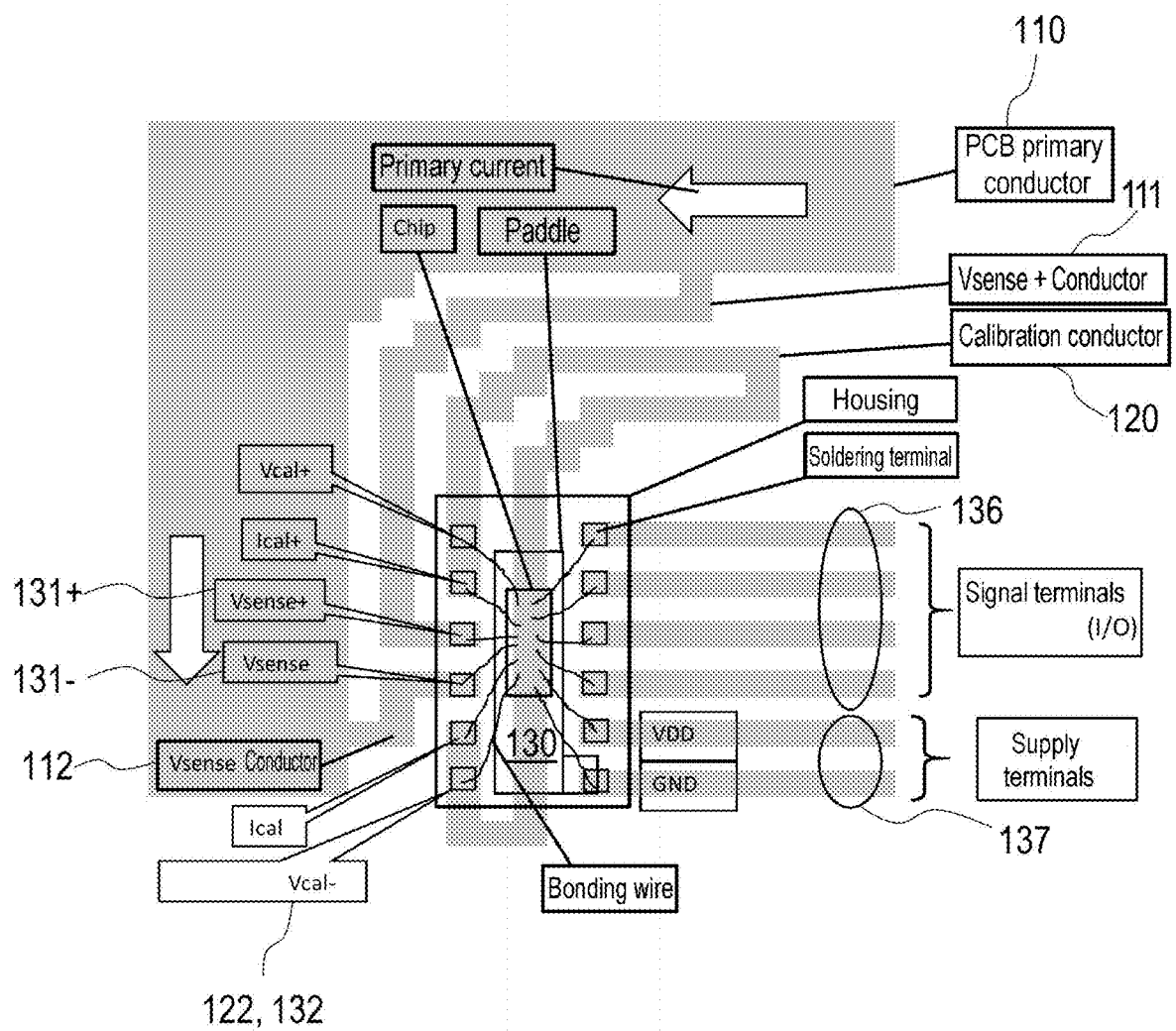
FIG. 2 shows a second example implementation of an apparatus for measuring a first electric current in a first printed conductor of a printed circuit board.

FIG. 2 shows an alternative implementation, in which the terminals 122 (Vcal−) and 112 (Vsense−) are routed to different soldering terminals 132 and 131 of the sensor IC 130. The number of soldering terminals on the sensor IC 130 is thus increased. FIG. 2 shows an example sensor IC 130 having twelve soldering terminals. The current measurement result can be output via the signal I/O lines 136 on the right-hand side of the housing of the sensor IC 130.

The arrangements represented in FIG. 1 and FIG. 2 are appropriate for current sensors having no galvanic isolation of the primary current and sensor circuits (supply and I/O terminals).

The resistance R2 of the calibration conductor 120 should assume a clearly defined ratio RAT to the resistance R1 of the primary conductor 110 between the Vsense terminals 111, 112 (R1=RAT*R2). In some implementations, both printed conductors 110, 120 are embodied in the same metal layer of the printed circuit board laminate. If the primary conductor 110 is comprised of multiple metal layers, the calibration conductor 120 should also be comprised of the same metal layers. In simple cases, the primary conductor 110 employs only one power metal layer (thicker than the others). In this case, the calibration conductor 120 will also employ the same power metal layer. Moreover, the width ($W_2$) of the calibration conductor 120 should not be excessively small, in the interests of preventing excessively high process tolerances (etching tolerances).

The calibration conductor 120 can open a conductor loop from terminal 123 (Ical+) to terminal 124 (Ical−), which can accommodate electromagnetic disturbances (e.g., associated with steep-front pulses in the primary current Isense). In the example implementation represented in FIG. 3, the measuring circuit employs a calibration conductor 120 having two looped printed conductor sections 120-1, 120-2 (calibration tracks), into which two predefined calibration currents Ical1, Ical2 of equal strength, but opposing polarity, are injected. In this case, the calibration conductor 120 thus comprises a first printed conductor section 120-1 and a second printed conductor section 120-2. The first calibration printed conductor section 120-1 forms an (open) conductor loop having a first direction of rotation (e.g., clockwise) and the second calibration printed conductor section 120-2 forms an (open) conductor loop having a second direction of rotation, which is in opposition to the first direction of rotation (e.g., counterclockwise). The sensor IC 130 is configured to inject a first predefined calibration current Ical1, in the first direction of rotation, into the first printed conductor section 120-1, and a second predefined calibration current Ical2, in the second direction of rotation, into the second printed conductor section 120-2. The two calibration currents Ical1 and Ical2 can assume equal current strengths. This results in a first voltage drop Vcal1 across the first calibration printed conductor section 120-1 and a second voltage drop Vcal2 across the second calibration printed conductor section 120-2. The sensor IC 130 can now determine the calibration voltage Vcal based on a combination of the calibration voltage drops Vcal1 and Vcal2 across the first and second calibration printed conductor sections 120-1, 120-2. For example, the sensor IC 130 can determine a differential in the calibration voltage drops Vcal1 and Vcal2. If the two calibration printed conductor sections 120-1, 120-2 are installed such that their respective EMI susceptibility is equal (identical loop regions and an equal clearance to the primary conductor 110), disturbances are cancelled out by the subtraction of the calibration voltage drops Vcal1 and Vcal2.

Figure 3:
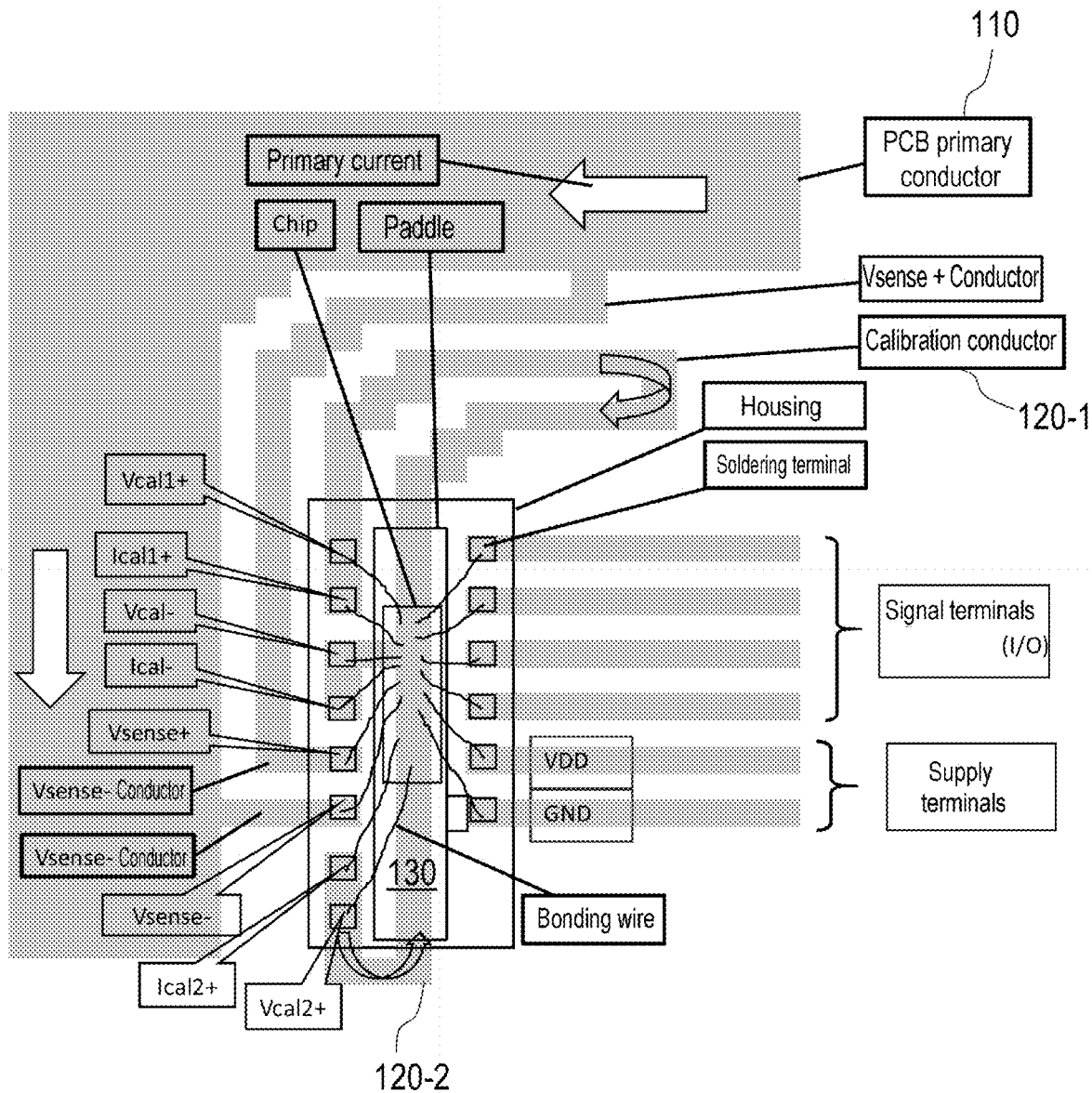
FIG. 3 shows a third example implementation of an apparatus for measuring an electric current in a first printed conductor of a printed circuit board.

FIG. 3 shows a measuring system, which injects a positive calibration current into terminal Ical1+ of the first calibration printed conductor section 120-1. In the example represented, the first calibration current Ical1+ flows clockwise through the upper first calibration printed conductor section 120-1 to terminal Ical−. The system also injects a positive calibration current into terminal Ical2+ of the second calibration printed conductor section 120-2. In the example represented, the second calibration current Ical2+ flows counterclockwise through the lower calibration printed conductor section 120-2 to terminal Ical−. The system measures the voltages (Vcal1+)-(Vcal−) and (Vcal2+)-(Vcal−), and executes the addition thereof. It is assumed that a uniform transient magnetic field acts perpendicularly to the plane of projection. This induces an interference voltage between terminals (Vcal1+)-(Vcal−) and an interference voltage between terminals (Vcal2+)-(Vcal−). However, these two interference voltages cancel each other out, as they assume opposing directions (clockwise and counterclockwise). Accordingly, only the voltage generated by the calibration currents Ical1+ and Ical2+ remains, and calibration is robust vis-à-vis electromagnetic interference fields.

If the loop surface areas of the two looped calibration printed conductors sections 120-1, 120-2 are identical, uniform magnetic interference is cancelled out perfectly. Additionally, a magnetic interference field is also generated by the primary current Isense, which flows in the primary conductor 110. This interference is non-uniform. The looped calibration printed conductor sections 120-1, 120-2 can also be arranged such that they also cancel out this non-uniform interference field generated by the primary current Isense. In a primary conductor 110 of complex design, this can be achieved, for example, by digital simulation.

Figure 4A:
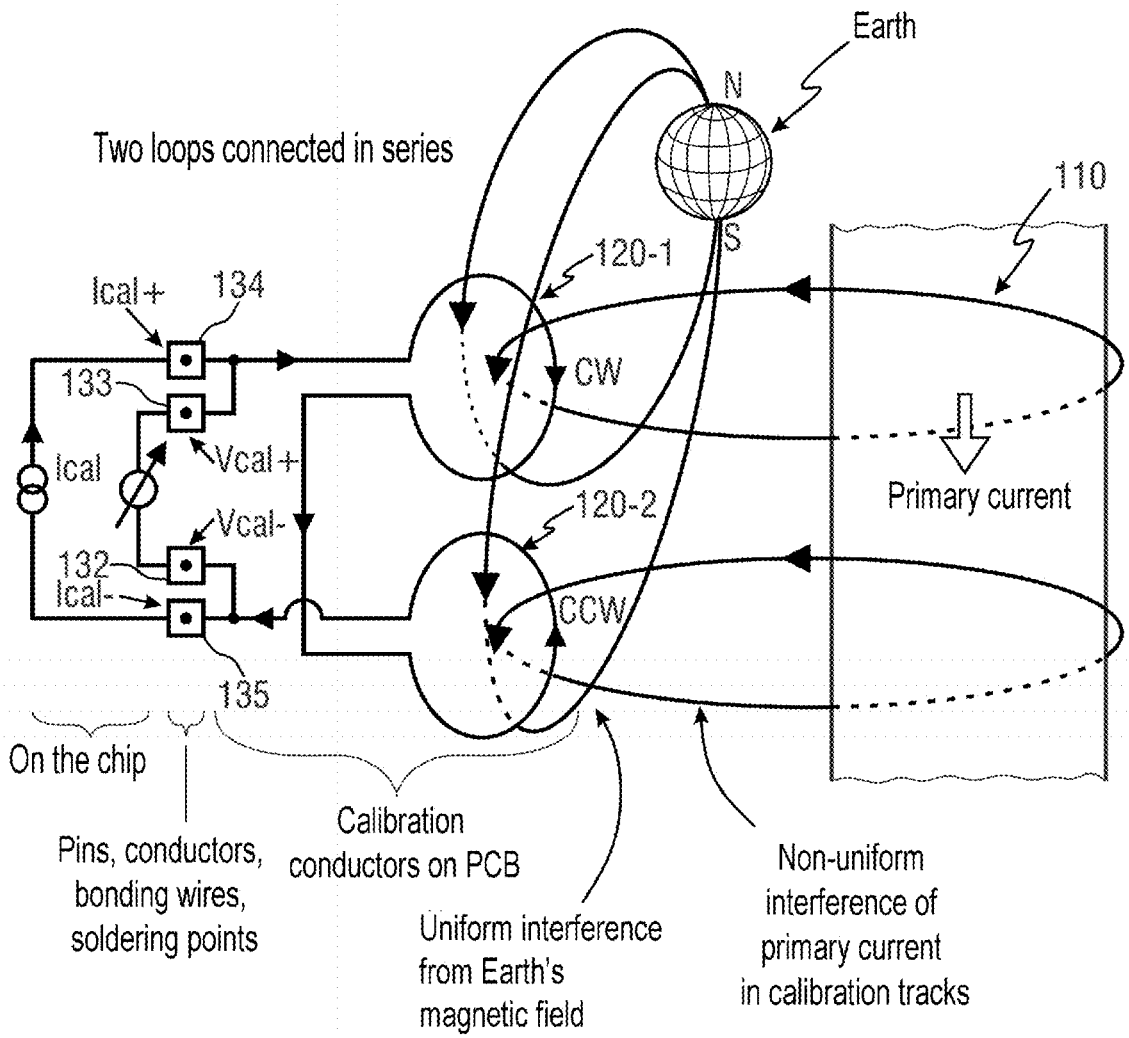
FIG. 4A shows a schematic layout of two series-connected looped printed conductor sections.
Figure 4B:
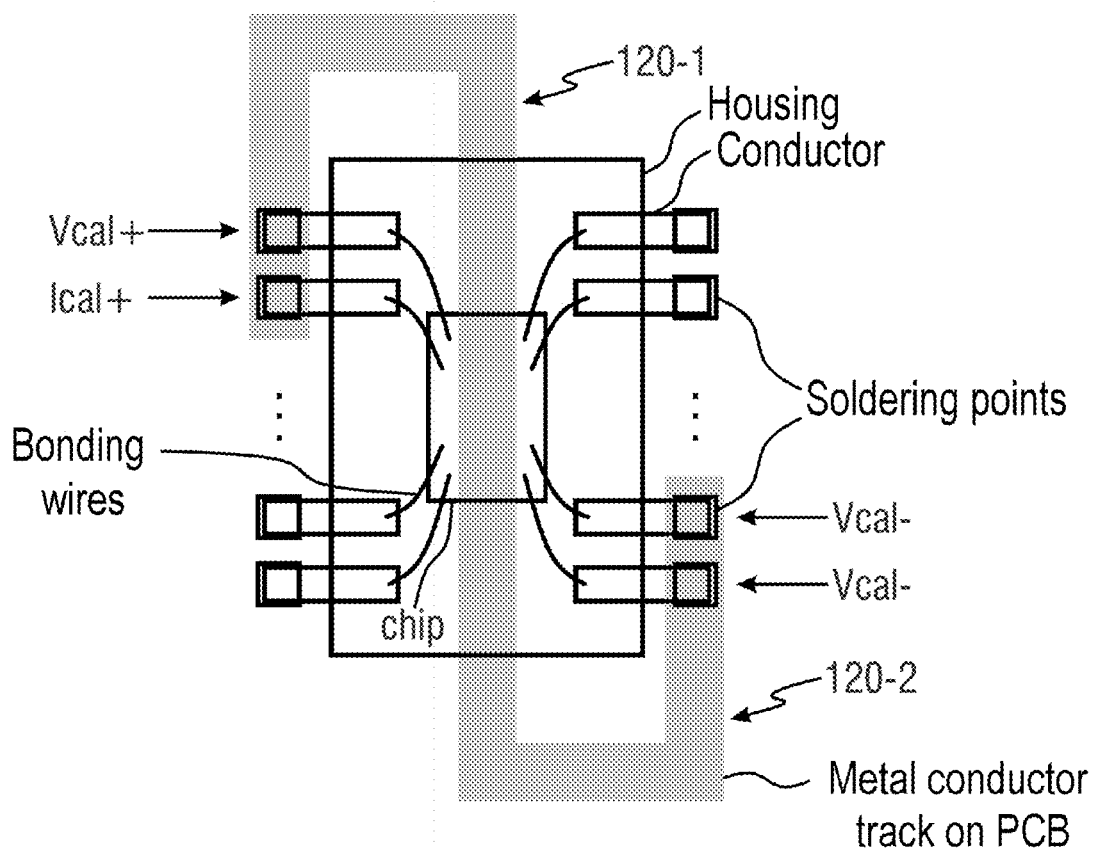
FIG. 4B shows an example circuit layout having two series-connected looped printed conductor sections.
Figure 5A:
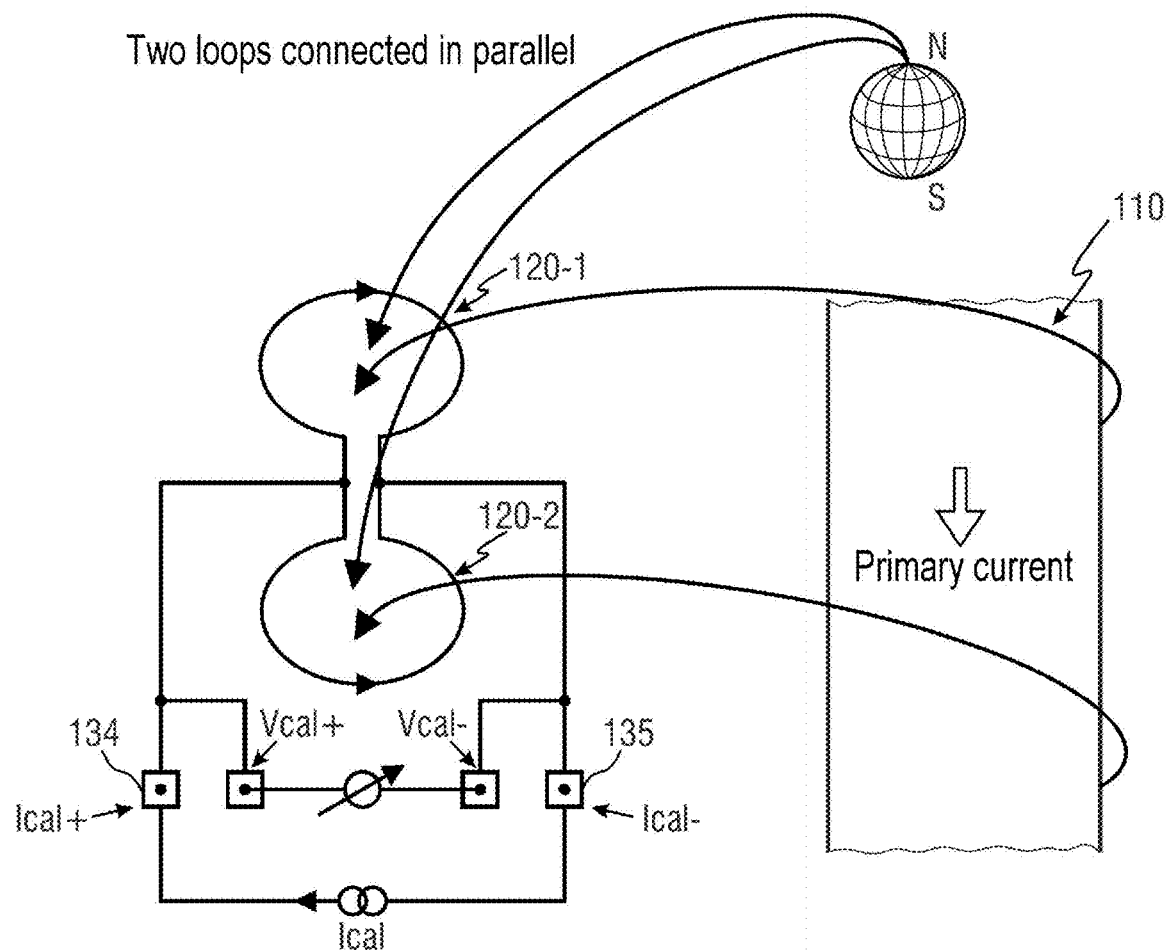
FIG. 5A shows a schematic layout of two parallel-connected looped printed conductor sections.
Figure 5B:
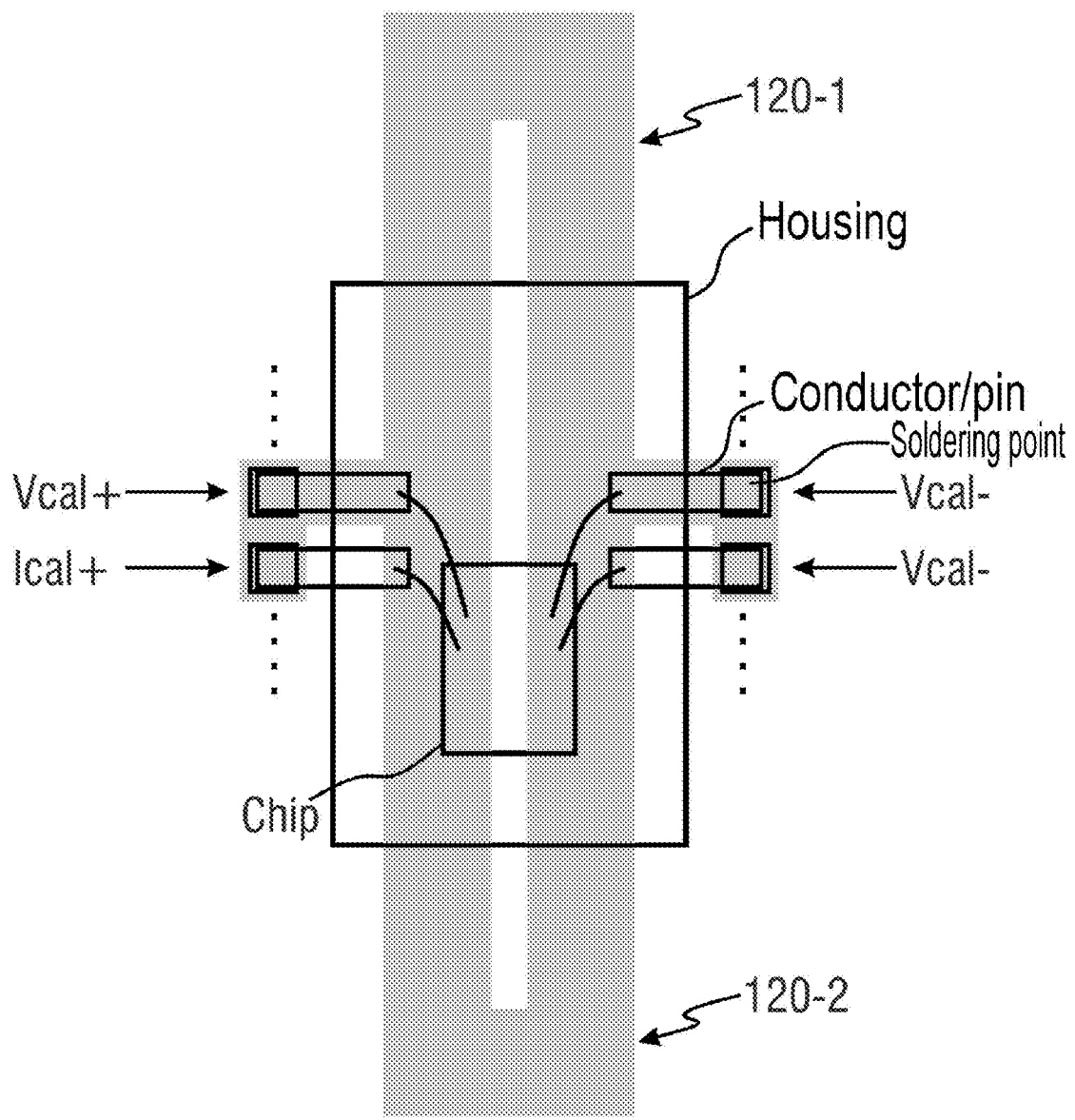
FIG. 5B shows an example circuit layout having two parallel-connected looped printed conductor sections.

Different implementations of the two looped printed conductor sections 120-1, 120-2 are possible. FIGS. 4A, 4B show an implementation in which the printed conductor sections 120-1, 120-2 are series-connected between the calibration current terminals 134 and 135. FIGS. 5A, 5B show an implementation in which the printed conductor sections 120-1, 120-2 are parallel-connected between the calibration current terminals 134 and 135.

The schematic circuit layout according to FIG. 4A shows a first looped printed conductor section 120-1, the first terminal of which is coupled to a first calibration current terminal 134 of the sensor IC 130. A second terminal of the first looped printed conductor section 120-1 is coupled to a first terminal of a second looped printed conductor section 120-1. A second terminal of the second looped printed conductor section 120-2 is coupled to a second calibration current terminal 135 of the sensor IC 130. The two looped printed conductor sections 120-1, 120-2 are thus series-connected between the calibration current terminals 134, 135. The calibration current Ical flows clockwise in the first looped printed conductor section 120-1, and counterclockwise in the second looped printed conductor section 120-2. Interference signals induced by uniform interference fields (e.g., the Earth's magnetic field) and/or by non-uniform interference fields (e.g., magnetic interference generated by the primary conductor 110) in the printed conductor sections 120-1, 120-2 are thus cancelled out.

To this end, FIG. 4B shows a circuit layout in which the soldering terminals Ical+, Vcal+ are arranged on the left-hand side of the sensor IC 130, and the soldering terminals Ical−, Vcal− are arranged on the right-hand side thereof. The soldering terminals Ical+, Vcal+ and the soldering terminals Ical−, Vcal− are located at different ends of the calibration conductor 120. The calibration conductor 120 extends in its first looped printed conductor section 120-1 from the soldering terminals Ical+, Vcal+, describing a clockwise bend in the direction of the sensor IC 130, and from thence in its second looped printed conductor section 120-2, describing a counterclockwise bend to the terminals Ical−, Vcal−.

The schematic circuit layout according to FIG. 5A shows a first looped printed conductor section 120-1, the first terminal of which is coupled to a first calibration current terminal 134 (Ical+) of the sensor IC 130. A second terminal of the first looped printed conductor section 120-1 is coupled to a second calibration current terminal 135 (Ical−) of the sensor IC 130. The schematic circuit layout according to FIG. 5A further shows a second looped printed conductor section 120-2, the first terminal of which is coupled to the first calibration current terminal 134 (Ical+) of the sensor IC 130. A second terminal of the second looped printed conductor section 120-2 is coupled to the second calibration current terminal 135 (Ical−) of the sensor IC 130. The two looped printed conductor sections 120-1, 120-2 are thus parallel-connected between the calibration current terminals 134, 135 parallel. The calibration current Ical flows clockwise in the first looped printed conductor section 120-1 and counterclockwise in the second looped printed conductor section 120-2. Interference signals induced by uniform interference fields (e.g., the Earth's magnetic field) and/or by non-uniform interference fields (e.g., magnetic interference generated by the primary conductor 110) in the printed conductor sections 120-1, 120-2 are thus cancelled out.

To this end, FIG. 5B shows a circuit layout in which the soldering terminals Ical+, Vcal+ are arranged on the left-hand side of the sensor IC 130, and the soldering terminals Ical−, Vcal− are arranged on the right-hand side thereof. The calibration conductor 120 extends in its first looped printed conductor section 120-1 from soldering terminals Ical+, Vcal+, describing a clockwise bend to the soldering terminals Ical−, Vcal. The calibration conductor 120 further extends in its second looped printed conductor section 120-2 from the soldering terminals Ical+, Vcal+, describing a counterclockwise bend to the soldering terminals Ical−, Vcal.

In an alternative implementation, the sensor IC 130 can measure multiple primary currents in multiple primary conductors. This means that the printed circuit board 100 can thus comprise multiple first primary conductors 110-1, 110-2, . . . . This can be particularly cost-effective, as only a single calibration conductor 120 (or two EMI-compensated calibration printed conductor sections 120-1, 120-2) will be required, independently of the number of primary currents Isense1, Isense2, . . . to be measured. It can therefore be advantageous, in these situations, that the sensor IC 130 comprises at least one output terminal, at which calibration information is delivered, and at least one input terminal, at which calibration information is received. It should moreover be possible for the injection of calibration current into the calibration conductor 120, and the corresponding processing and extraction of calibration information, to be deactivated. It is then possible, for example, for a group of N sensor ICs 130 to cooperate: only one sensor IC 130 will have activated the injection of calibration current. This measures the resistance R2 of the calibration conductor 120, and relays the result to all the other sensor ICs 130. All the other IC sensors 130 can deactivate calibration current injection, thereby potentially saving current. Each sensor IC 130-$n$ measures the voltage drop Vsense-n along its dedicated primary conductor 110-$n$ and calculates the primary current Isense-n by the application of the same calibration signal (resistance R2 of the calibration track 120).

It can be advantageous that the connecting terminals Vsense+, Vsense− are arranged in the closest possible mutual proximity, in order to permit the achievement of a uniform temperature and prevent the generation of any thermo-electromotive forces which might cause a zero error (offset) in the current sensor 130. The soldering terminals 131, 135 for Vsense+, Vsense−, for example, can thus be arranged adjacently to one another on the IC housing.

The known calibration current Ical can assume an order of magnitude of a few milliamperes (in order to maintain sensor power consumption within acceptable limits). The known calibration current can be a direct current (DC), but is preferably an alternating current (AC), as AC power engineering is not impaired by zero-error (offset) signal processing elements of the circuit, and is not impaired by thermo-electromotive forces. An AC frequency should not be excessively high (<1 MHz), as the voltage drop on the calibration conductors 120, 120-1, 120-2 will otherwise contain a not insignificant inductive component, which is dependent upon the geometry of the calibration conductor and generates an error in current measurement. An optimum frequency for the calibration current Ical lies between 1 kHz and 100 kHz, as this exceeds the cut-off frequency of the 1/f-noise ratio of integrated electronic devices. The calibration frequency should not coincide with strong spectral components of the primary current Isense (as crosstalk interference might then occur between the primary current Isense and the calibration current Ical).

As the calibration current Ical is far smaller than the primary current Isense, the calibration voltage drop Vcal is also generally smaller. In order to achieve a high degree of accuracy, the switch-in of the SNR (signal-to-noise ratio) can enhance calibration measurement, wherein lock-in techniques (=frequency- and phase-selective techniques) are employed for the detection of the calibration voltage. The calibration management bandwidth can therefore be reduced below 100 Hz, preferably to 10 Hz, 1 Hz or 0.1 Hz. In other words, an AC voltage between the connecting terminals Vcal+, Vcal− can be integrated with time constants between 10 ms and 10 s. If a temperature of the primary track 110 varies more rapidly than a temperature of the calibration track 120, a slow calibration measurement can result in a dynamic error. In a further implementation, the measuring apparatus comprises a (high-speed) temperature sensor, which can detect a temperature difference (T-difference) between the primary conductor 110 and the calibration conductor 120. The resistance R2 of the calibration conductor 120 can then be multiplied by a corrective coefficient TCRnom*T-difference (TCRnom . . . nominal temperature coefficient of the resistance of the metal printed circuit board conductor tracks). The measuring apparatus can disable this corrective function, if the temperature difference (T-difference) lies below a specific threshold value and/or if a rate of variation of one of the temperatures (of the primary conductor 110 and the calibration conductor 120) lies below another specific threshold value. Calibration measurement, for example, can thus be additionally adjusted in accordance with environmental influences (such as temperature, mechanical stress, a substantial variation in the current strength of the first current) in a region around the first and/or second printed conductor. In the event of little or no variation in environmental influences, calibration measurement can be executed only occasionally or rarely (e.g., only once per second, or only every 10 seconds). In the event of regular variations in environmental influences, calibration measurement can be executed more frequently. This means that a rate of calibration measurement can be adjusted according to a variation in environmental influences. The greater the variation, the higher the rate of calibration measurement.

A primary conductor 110 is present, in which the primary current Isense which is to be determined flows, and generates a small voltage drop along the primary conductor 110, in the direction of current flow. Moreover, two sensor leads (Vsense-traces) 111, 112 are provided, which tap-off a potential of the primary conductor 110 at two points, and relay the resulting voltage drop to the sensor package 130 (preferably on adjoining soldered connections/pins/pads/lands). The sensor leads 111, 112 are characterized in that, in normal operation (e.g., during current measurement) no significant current flows in these sensor leads 111, 112, as measuring errors can occur as a result. A resistance of the sensor leads 111, 112 is not critical. Moreover, at least one calibration conductor 120 is provided, having an injection point 123 and an offtake point 124. At both points 123, 124, the calibration current Ical can be introduced or extracted. Between these two points 123, 124, the calibration conductor 120 forms no closed loop and, on the path of the calibration current Ical from the injection point 123 to the offtake point 124, the voltage Vcal decreases in a monotonous manner. Moreover, between the two points 123, 124, two voltage sensor points 121, 122 are provided, which capture a proportion (<100%) of the voltage between the injection point 123 and the offtake point, which is routed to the chip 130 for measurement.

The first resistance R1 occurs in the primary conductor 110 between the two sensor leads (Vsense-traces) 111, 112. The second resistance R2 is present in the calibration conductor 120, again between the voltage sensor points 121, 122.

A potential dimensioning of the measuring circuit is described hereinafter.

If a nominal current rating of 50 A is assumed for the primary current Isense, the resistance R1 of the primary conductor 110 will be, for example, 200 µOhm (for a magnetic current sensor of the same rating, a resistance of 450 µOhm is customary). At 50 A, the voltage drop Vsense+−Vsense−=50*200µ=10 mV and the power loss is 0.5 W. A magnetic current sensor with Hall plates, at the full rated current, has a flux density of the order of 20 mT. The Hall plate has a sensitivity of 150 mV/T, which corresponds to a Hall output voltage of 150 µV/mT*20mT=3 mV. The proposed printed circuit board current sensor thus assumes only half the primary resistance and three times the input voltage of the circuit.

The calibration conductor 120, for example, can assume a 5-times smaller width ($W_2$) and a 5-times greater length ($L_2$) than the primary conductor 110, thus generating a 25-times greater resistance R2 than the 200 µOhm of the primary conductor track 110. The calibration current Ical can be selected at 5 mA which, in the example, is 10,000 times smaller than the primary current Isense. The calibration voltage Vcal can thus be 400 times smaller than the primary voltage Vsense. The SNR of the calibration voltage Vcal should therefore be 400 times higher than that of the primary voltage Vsense. This can be achieved, for example, by a reduction of the bandwidth by 400^2=160,000. In practice, it is relatively simple to raise the SNR of the calibration voltage by a factor of 400, using a bandwidth reduction of $400^2$: for example, the bandwidth for primary current measurement is 1 MHz, and the bandwidth for calibration current measurement must therefore be limited to 10^6/400^2=6.25 Hz, which is possible using appropriate mean value generation.

As described above, the proposed printed circuit board current sensor can typically assume a 50% lower power loss in the primary conductor 110, and a 300% higher signal. An impedance value of Hall plates is of the order of magnitude of 1 kΩ, whereas an impedance value of the printed circuit board current sensor can lie below 1 mΩ. This can generate a 3,000-times higher SNR, superior resolution and reduced noise, thus permitting investment in greater bandwidth. A limiting factor for the impedance value of the voltage drop Vsense, which is measured across the primary conductor 110, is the quality of bonding wire connection. Impedance is of an order of magnitude of Ω, rather than mΩ, and an improvement in the SNR vis-à-vis magnetic current sensors is only 100, rather than 3,000—although this can be avoided by the employment of superior bonding wires, multiple bonding wires per contact or other technologies, such as flip-chip assembly using solder bumps/balls.

A further advantage of the proposed printed circuit board current sensor is provided, in that no opening in the primary conductor 110 is required (in magnetic current sensors, current is generally routed via a leadframe, in which it is required to negotiate two series-connected soldering points, which represent weak points for electromigration). The printed circuit board current sensor can be seamlessly integrated in the printed circuit board design, with no additional line losses.

The sensor IC 130 has no restrictions with respect to chip surface area: node miniaturization technologies can be exploited→small chip sizes→more cost-effective prices. Conversely, magnetic current sensors require two magnetic field sensors arranged with a mutual spacing, and a major proportion of the primary current is required to flow via a constriction in the primary conductor which, in an overhead view, is arranged between the two sensor elements=>consequently, in magnetic current sensors, chip size cannot be arbitrarily reduced, particularly in the case of high primary current ratings. The proposed printed circuit board current sensor can also be more robust vis-à-vis electromagnetic disturbances.

The proposed printed circuit board current sensor provides a further advantage over conventional shunts: shunts have high resistances, and are additional components associated with additional costs, require additional space and generate additional weight, require additional soldering points, increased volumes and additional wiring. Conventional shunts are susceptible to ageing, whereas the proposed printed circuit board current sensor is not susceptible to ageing of the primary conductor 110. In the event of any drift in the resistance of the metal layer(s) of the printed circuit board in the course of its service life (associated with corrosion or irradiation, or simply on the grounds of temperature variations), the sensor IC 130 can detect this drift in the resistance of the calibration conductor 120. The circuit generates a reference voltage and a reference current Ical. Both these variables should be highly stable. The reference voltage, for example, can be generated by bandgap circuits having compensating circuits for mechanical voltage drift. The reference current Ical can be generated by a voltage replication function, using a resistor with a low piezoresistive coefficient (e.g., a metal resistor, a silicided polysilicon resistor or a p-doped diffusion/implantation resistor in a L-layout. The resulting limited voltage drift of this reference current Ical is a few percentage points per gigapascal; it can be further reduced using a voltage compensating circuit, which measures the sum of standard voltage components in a plane arrangement (=sigXX+sigYY) and executes a corresponding fine adjustment of current. Using all these methods, piezo-drift in calibration resistance measurement can be limited to 1%/GPa.

Aspects and features described in conjunction with one of the specific above-mentioned examples can also be combined with one or more of the further examples, in order to replace an identical or similar feature of the further example, or to introduce an additional feature into the further example.

It is further understood that, in case of the disclosure of multiple steps, processes, operations and functions which are disclosed in the description or in the claims, the execution thereof in the sequence described is not mandatory, unless this is specifically indicated in the individual case concerned or is absolutely necessary for technical reasons. Consequently, the above-mentioned description does not limit the execution of multiple steps or functions to a specific sequence. Moreover, in further examples, an individual step, an individual function, and individual process or an individual operation can comprise a plurality of sub-steps, sub-functions, sub-processes or sub-operations, and/or can be subdivided into the latter.

Where certain aspects have been described in the preceding paras with reference to an apparatus or a system, these aspects are also to be understood as a description of the corresponding method. Thus, for example, a unit, an apparatus or a functional aspect of the apparatus or system can correspond to a feature, for example to a process step, of the corresponding method. Correspondingly, aspects described in conjunction with a method are also to be understood as a description of a corresponding unit, a corresponding element, a property or a functional feature of a corresponding apparatus or of a corresponding system.

The following claims are thus included in the detailed description, wherein each claim can represent a separate example per se. It should further be observed that—although, in the claims, a dependent claim relates to a specific combination with one or more further claims—other examples can also comprise a combination of the dependent claim with the subject matter of each other dependent or independent claim. Such combinations are thus explicitly proposed, unless it is indicated, in a particular case, that a specific combination is not intended. Moreover, features of a claim can also be included in each other independent claim, even if the claim is not directly defined as dependent upon the other independent claim.

The invention claimed is:

1. An apparatus for measuring a first electric current in a first printed conductor of a printed circuit board, which comprises a second printed conductor, wherein a ratio of electrical resistances between the first printed conductor and the second printed conductor is known, wherein the apparatus comprises:
 a sensor integrated circuit (IC) configured to:
  measure a first electric voltage across the first printed conductor based on the first electric current in the first printed conductor;
  inject a known second electric current into the second printed conductor;
  measure a second electric voltage across the second printed conductor based on the known second electric current in the second printed conductor; and
  determine the first electric current based on the first electric voltage, the second electric voltage, the known second electric current, and the ratio of electrical resistances between the first printed conductor and the second printed conductor.

2. The apparatus as claimed in claim 1, wherein the first printed conductor and the second printed conductor are implemented in a same metal layer of the printed circuit board.

3. The apparatus as claimed in claim 1, wherein the first printed conductor is galvanically isolated from the second printed conductor.

4. The apparatus as claimed in claim 1, wherein the sensor IC is further configured to determine:
 a second electrical resistance of the second printed conductor based on the second electric voltage and the known second electric current; and
 the first electric current based on the first electric voltage, the second electrical resistance, and the ratio of electrical resistances between the first printed conductor and the second printed conductor.

5. The apparatus as claimed in claim 1, wherein a second ratio of a length to a width of the second printed conductor is greater than a first ratio of a length to a width of the first printed conductor.

6. The apparatus as claimed in claim 1, wherein the sensor IC is configured to inject the known second electric current in a form of current pulses having a predefined current strength and frequency into the second printed conductor.

7. The apparatus as claimed in claim 1, wherein the second printed conductor comprises:
a first printed conductor section and a second printed conductor section,
wherein the first printed conductor section forms a conductor loop for a current flux having a first direction of rotation, and the second printed conductor section forms a conductor loop for a current flux having a second direction of rotation, which is in opposition to the first direction of rotation, and
wherein the sensor IC is configured to inject a current corresponding to the known second electric current, in the first direction of rotation, into the first printed conductor section and a current corresponding to the known second electric current, in the second direction of rotation, into the second printed conductor section.

8. The apparatus as claimed in claim 7, wherein the sensor IC is configured to determine the second electric voltage based on a combination of respective voltage drops across the first printed conductor section and the second printed conductor section.

9. The apparatus as claimed in claim 7, wherein the first printed conductor section and the second printed conductor section each assume essentially a same electromagnetic interference (EMI) susceptibility.

10. The apparatus as claimed in claim 1, wherein the sensor IC includes a common surface-mounted device component, wherein the common surface-mounted device component comprises soldering terminals for the first printed conductor and the second printed conductor.

11. The apparatus as claimed in claim 10, wherein the common surface-mounted device component comprises a first soldering terminal and a second soldering terminal for measuring the first electric voltage across the first printed conductor, a third soldering terminal and a fourth soldering terminal for measuring the second electric voltage across the second printed conductor, and a fifth soldering terminal and a sixth soldering terminal for injecting the known second electric current into the second printed conductor.

12. The apparatus as claimed in claim 11, wherein the first printed conductor is connected to the first soldering terminal and the second soldering terminal, and wherein the second printed conductor is connected to the third soldering terminal, the fourth soldering terminal, the fifth soldering terminal, and the sixth soldering terminal.

13. The apparatus as claimed in claim 10, wherein the ratio of electrical resistances of the first printed conductor and the second printed conductor is saved in the common surface-mounted device component.

14. A printed circuit board, comprising:
a first printed conductor having a first electrical resistance;
a second printed conductor having a second electrical resistance,
wherein a ratio of the first electrical resistance of the first printed conductor to the second electrical resistance of the second printed conductor is known; and
a surface-mounted device component having contact-connections with the first printed conductor and the second printed conductor,
wherein the surface-mounted device component is configured:
to measure a first voltage drop across the first printed conductor associated with a first electric current flowing in the first printed conductor;
to inject a known second electric current into the second printed conductor;
to measure a second voltage drop across the second printed conductor associated with the known second electric current flowing in the second printed conductor; and
to determine the first electric current based on the first voltage drop, the second voltage drop, the known second electric current, and the ratio of the first electrical resistance of the first printed conductor and the second electrical resistance of the second printed conductor.

15. A method for measuring a first electric current in a first printed conductor of a printed circuit board, which comprises a second printed conductor, wherein a ratio of electrical resistances between the first printed conductor and the second printed conductor is known, the method comprising:
measuring a first electric voltage across the first printed conductor associated with the first electric current flowing in the first printed conductor;
injecting a known second electric current into the second printed conductor;
measuring a second electric voltage across the second printed conductor associated with the known second electric current flowing in the second printed conductor; and
determining the first electric current based on the first electric voltage, the second electric voltage, the known second electric current, and the ratio of the electrical resistances of the first printed conductor and the second printed conductor.

16. The method as claimed in claim 15, wherein the first printed conductor and the second printed conductor are implemented in a same metal layer of the printed circuit board.

17. The method as claimed in claim 15, wherein the first printed conductor is galvanically isolated from the second printed conductor.

18. The method as claimed in claim 15, further comprising:
determining a second electrical resistance of the second printed conductor based on the second electric voltage and the known second electric current; and
determining the first electric current based on the first electric voltage, the second electrical resistance, and the ratio of electrical resistances between the first printed conductor and the second printed conductor.

19. The method as claimed in claim 15, wherein a second ratio of a length to a width of the second printed conductor is greater than a first ratio of a length to a width of the first printed conductor.

20. The method as claimed in claim 15, wherein injecting the known second electric current comprises:
injecting the known second electric current in a form of current pulses having a predefined current strength and frequency into the second printed conductor.

* * * * *